Figure 1:
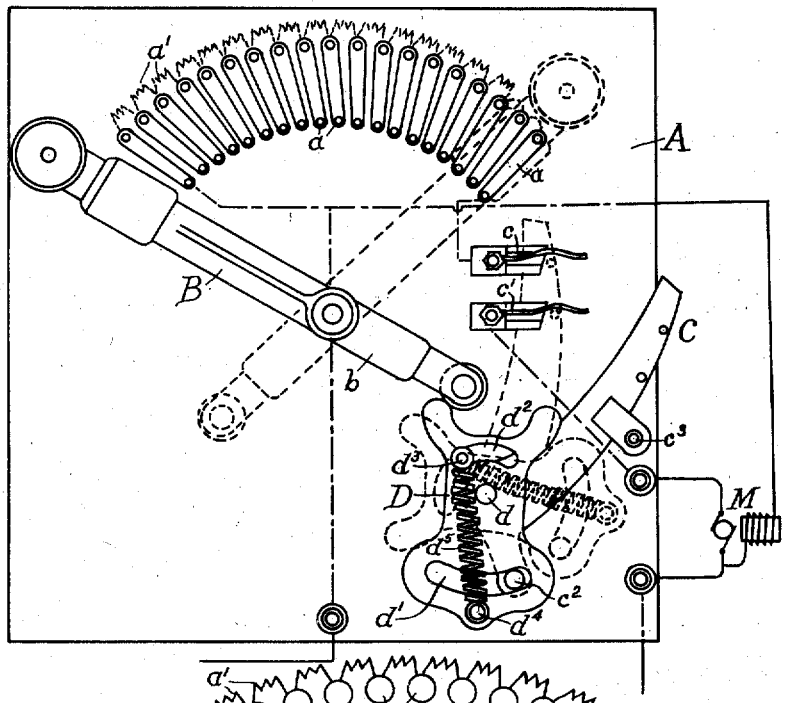

No. 12,530. REISSUED SEPT. 11, 1906.

H. W. LEONARD.

ELECTRICAL CIRCUIT CONTROLLER.

APPLICATION FILED JULY 2, 1906.

8 SHEETS—SHEET 1.

WITNESSES

L. K. Sager.

Geo. N. Kerr.

INVENTOR

H. Ward Leonard

BY

C. W. Edwards

HIS ATTORNEY

No. 12,530. REISSUED SEPT. 11, 1906.

H. W. LEONARD.

ELECTRICAL CIRCUIT CONTROLLER.

APPLICATION FILED JULY 2, 1906.

8 SHEETS—SHEET 2.

WITNESSES

L. K. Sager

Geo. N. Kerr

INVENTOR

H. Ward Leonard

BY

C. N. Edwards

HIS ATTORNEY

No. 12,530. REISSUED SEPT. 11, 1906.

H. W. LEONARD.

ELECTRICAL CIRCUIT CONTROLLER.

APPLICATION FILED JULY 2, 1906.

8 SHEETS—SHEET 3.

WITNESSES

L. K. Sager.

Geo. N. Kerr.

INVENTOR

H. Ward Leonard

BY

C. W. Edwards

HIS ATTORNEY

No. 12,530. REISSUED SEPT. 11, 1906.

H. W. LEONARD.

ELECTRICAL CIRCUIT CONTROLLER.

APPLICATION FILED JULY 2, 1906.

8 SHEETS—SHEET 4.

WITNESSES

L. K. Sager.

Geo. N. Kerr.

INVENTOR

H. Ward Leonard

BY

C. W. Edwards

HIS ATTORNEY

No. 12,530. REISSUED SEPT. 11, 1906.

H. W. LEONARD.

ELECTRICAL CIRCUIT CONTROLLER.

APPLICATION FILED JULY 2, 1906.

8 SHEETS—SHEET 5.

WITNESSES

L. K. Suger.

Geo. N. Kerr.

INVENTOR

H. Ward Leonard

BY

C. W. Edwards

HIS ATTORNEY

No. 12,530. REISSUED SEPT. 11, 1906.

H. W. LEONARD.

ELECTRICAL CIRCUIT CONTROLLER.

APPLICATION FILED JULY 2, 1906.

8 SHEETS—SHEET 6.

WITNESSES

L. K. Sager.

Geo. N. Kerr.

INVENTOR

H. Ward Leonard

BY

C. W. Edwards

HIS ATTORNEY

No. 12,530. REISSUED SEPT. 11, 1906.

H. W. LEONARD.

ELECTRICAL CIRCUIT CONTROLLER.

APPLICATION FILED JULY 2, 1906.

8 SHEETS—SHEET 7.

WITNESSES

L. K. Sager.

Geo. N. Kerr

INVENTOR

H. Ward Leonard

BY

C. W. Edwards.

HIS ATTORNEY

No. 12,530. REISSUED SEPT. 11, 1906.

H. W. LEONARD.

ELECTRICAL CIRCUIT CONTROLLER.

APPLICATION FILED JULY 2, 1906.

8 SHEETS—SHEET 8.

WITNESSES

S. K. Sager.

Geo. N. Kerr

INVENTOR

H. Ward Leonard

BY

C. W. Edwards

HIS ATTORNEY

UNITED STATES PATENT OFFICE.

HARRY WARD LEONARD, OF BRONXVILLE, NEW YORK.

ELECTRICAL-CIRCUIT CONTROLLER.

No. 12,530. Specification of Reissued Letters Patent. Reissued Sept. 11, 1906.

Original No. 817,719, dated April 10, 1906. Application for reissue filed July 2, 1906. Serial No. 324,528.

*To all whom it may concern:*

Be it known that I, HARRY WARD LEONARD, a citizen of the United States, residing at Bronxville, in the county of Westchester and State of New York, have invented a certain new and useful Improvement in Electrical-Circuit Controllers, of which the following is a specification.

My invention relates generally to controlling-switches, and has a particular application to motor-starting rheostats, or rheostats employed with electric motors or other electrical translating devices in which the resistance is employed not for regulating the energy supplied to the motor or other translating device, but mainly for gradually raising the energy at the terminals of the translating device to the full electromotive force. My invention is also of importance where regulating resistances are used and to prevent their improper operation. I have found in practice that such rheostats are frequently damaged by holding or permitting the contact-lever to remain on the initial or starting contact or contacts near the same with all the resistance of the rheostat or a considerable portion thereof in circuit. I have also found that operators frequently close the circuit at the initial or starting contact of the rheostat and then return the lever to the idle position, thus drawing an arc at the initial contact. This also damages the rheostat. I have also found that operators sometimes close the main circuit when the resistance-controlling device, which might be used as a regulator, is in an intermediate position. This of course allows an excessive and damaging flow of current.

The main object of my invention is to devise a starting rheostat or controller or to provide the present type of rheostats with a controlling device which will prevent this improper handling of such rheostats. I have devised many ways for carrying out this object, both mechanically and electrically.

In order to prevent the burning at the initial contact of the rheostat, due to the closing of the circuit upon insufficient surface or due to the backward movement of the contact-lever after making the first contact, which results in the formation of an arc due to the full electromotive force and one hundred and fifty per cent. of the full torque current, (when the motor has no counter electromotive force,) the rheostat should be provided with an auxiliary switch by which the circuit is quickly closed upon an ample surface and which switch will open the circuit with a snap action when the contact-lever is returned to the initial position. This auxiliary switch should be beyond direct hand control in opening and may be mechanically or electrically controlled by the rheostat contact-lever or controlling-switch.

In one form the rheostat contact-lever may be arranged to start a spring-actuated auxiliary switch which closes or opens with a snap action when the rheostat contact-lever is moved forward or backward at the starting position. In some instances this switch may be a small one which either opens or closes another circuit, and thereby energizes a large quick-acting circuit-breaker. In such an arrangement the small switch need not be quick acting if it opens or closes the circuit to the coil of an automatic circuit-breaker whose current is very small—as, for instance, in the case of a winding connected with the full electromotive force with or without resistance, in series therewith. In other arrangements the auxiliary switch may be of various forms, preferably a spring-actuated electrically-controlled switch of the automatic circuit-breaker type, the action of which is controlled by the variations in or the opening or closure of a circuit controlled by the position of the rheostat-lever.

In order to obtain quick action of the auxiliary switch at the time of making or breaking contact, it is important to suddenly apply a force or suddenly make a force effective at its full value to control its movement, and in carrying my invention into practice this may be accomplished by using a mechanical hammer-blow device, a tripping device, so as to cause a spring or gravity to act suddenly and at its full force, or by the energization or deënergization of a magnet to give the resulting quick action to the switch moved thereby.

My invention includes various other improvements and advantages, which will be understood from the following description and accompanying drawings.

My invention is illustrated in the accompanying drawings, in which—

Figure 2:
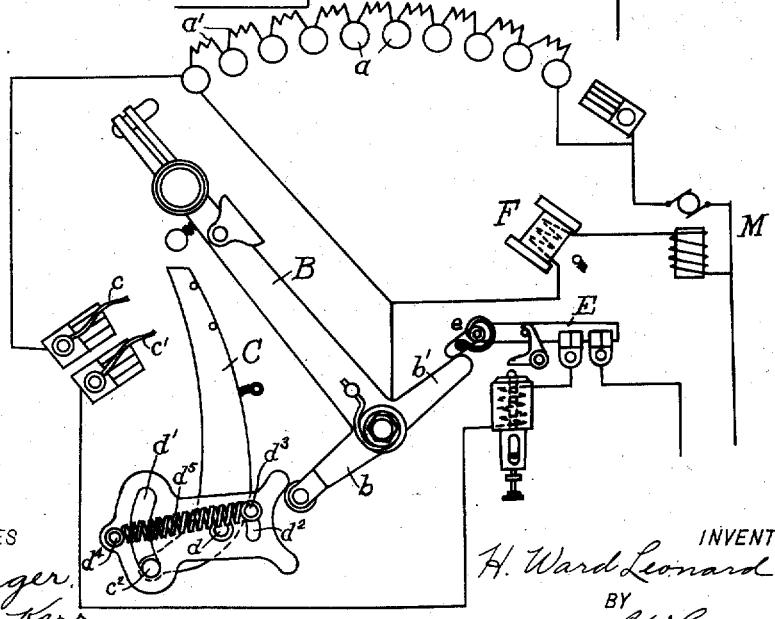
Figure 3:
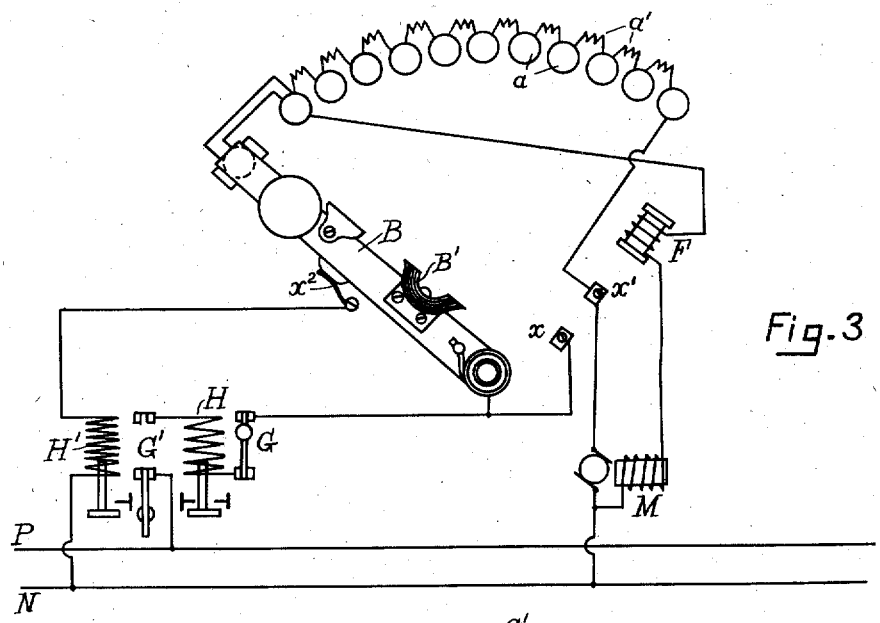
Figure 7:
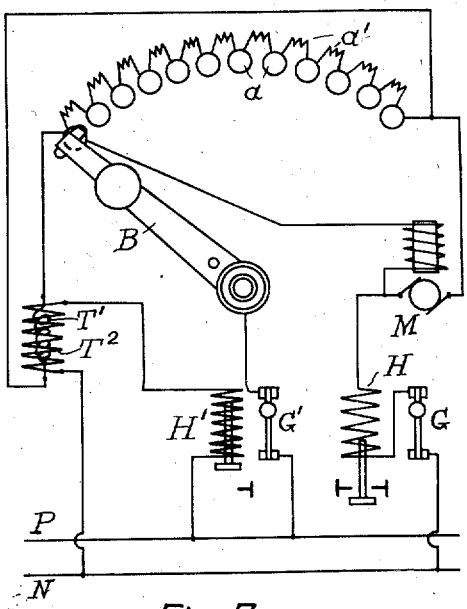
Figure 8:
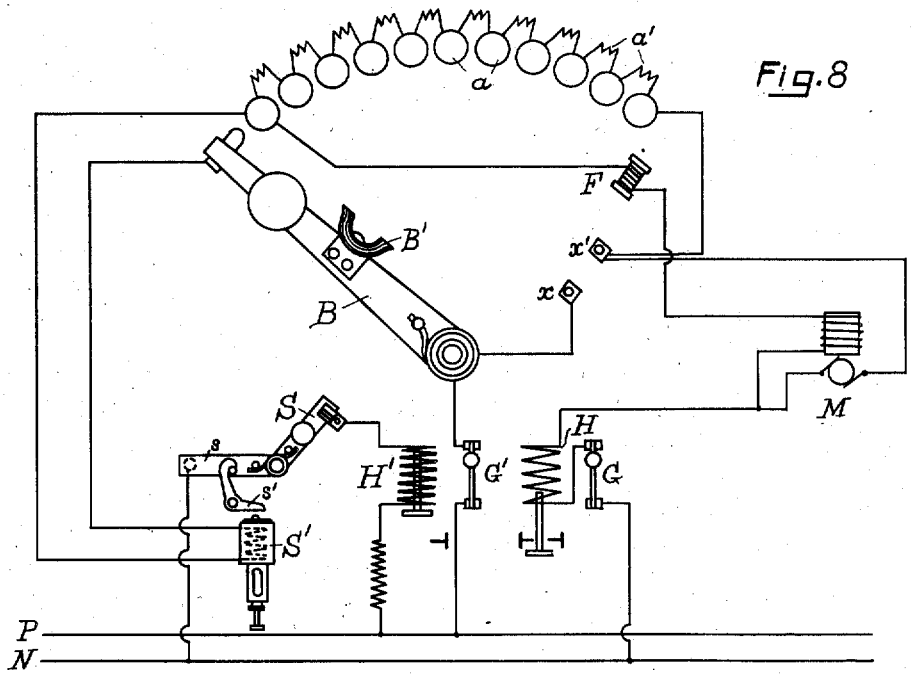
Figure 9:
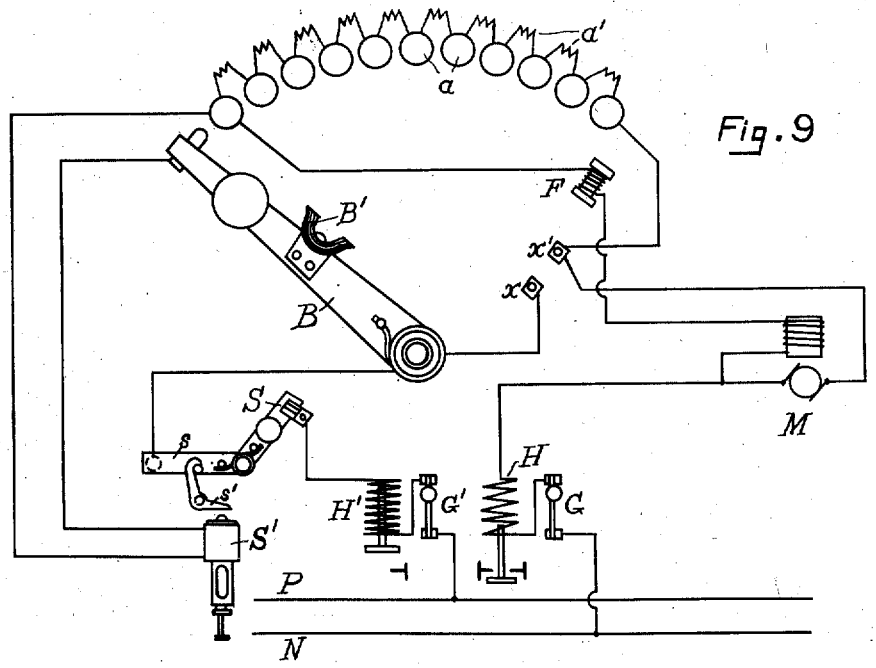
Figure 10:
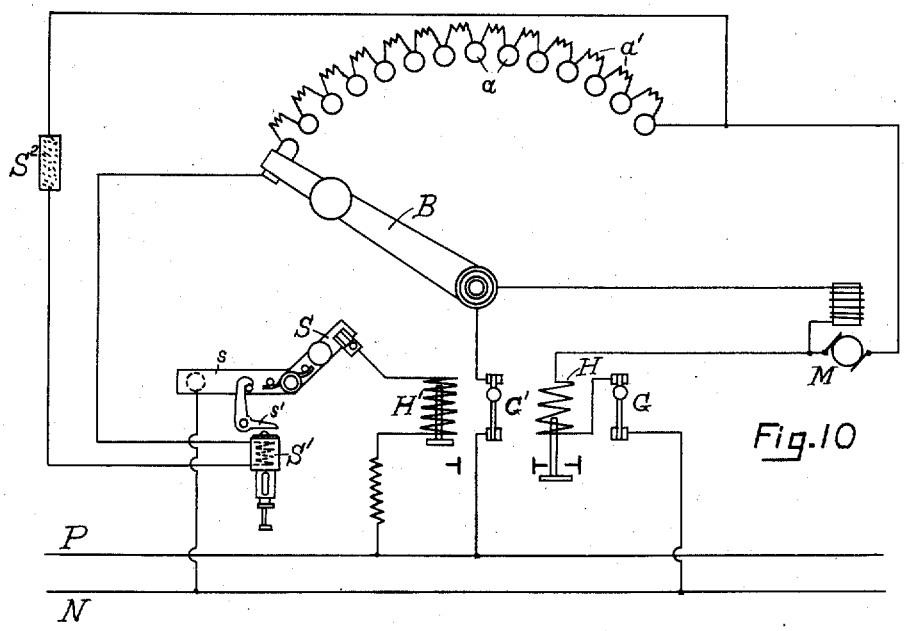
Figure 11:
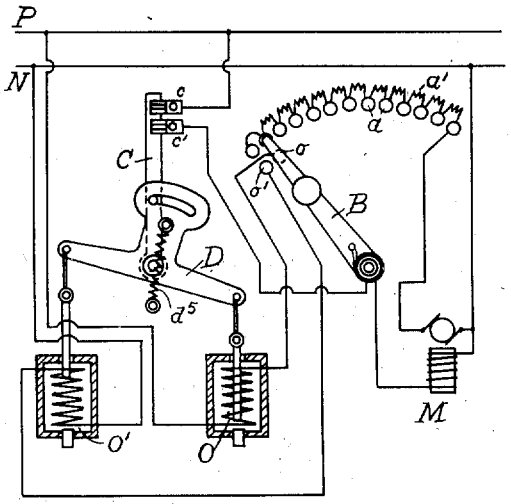
Figure 12:
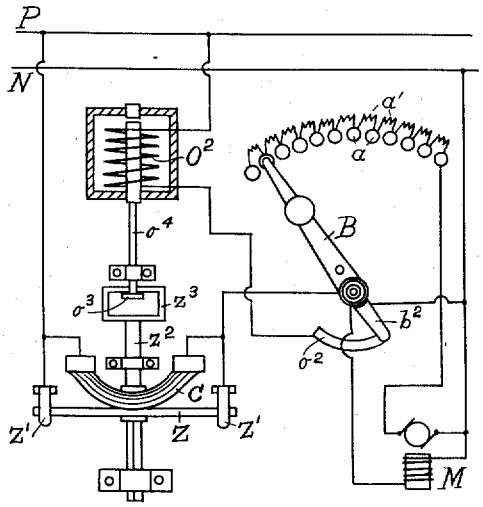
Figure 17:
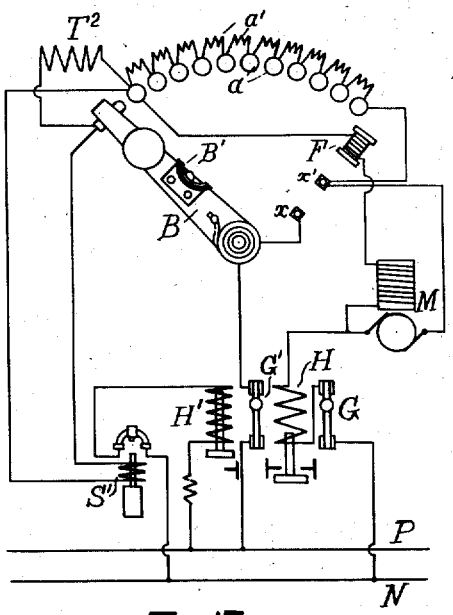
Figure 18:
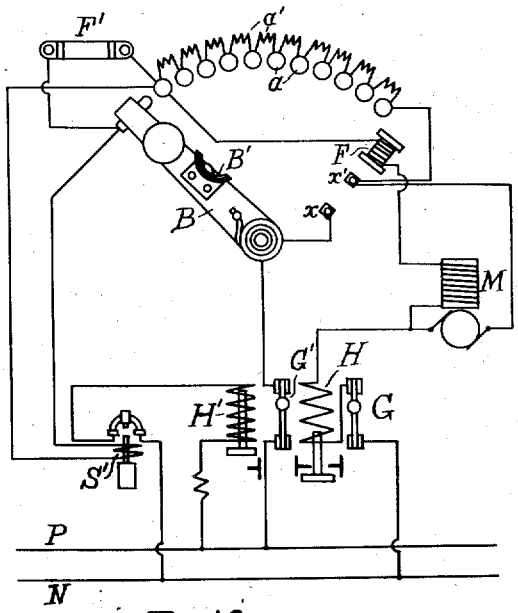
Figure 19:
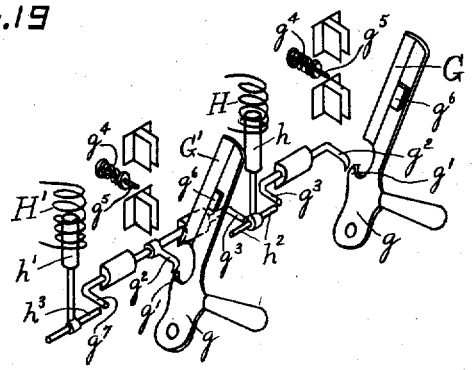
Figure 20:
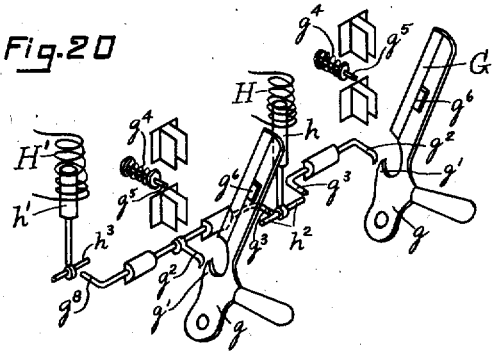

Figure 1 is a plan view of a rheostat provided with an auxiliary switch having a spring-actuated hammer arranged to be started by direct engagement with the rheostat contact-lever. Fig. 2 is a diagrammatic illustration of a similar form of rheostat provided with an overload-switch the closure of which is also controlled by the movement of the rheostat-lever in one direction. Fig. 3 is a diagrammatic view of a modified form of controller in which the auxiliary and overload switches are mechanically independent of the rheostat-lever. Figs. 4, 5, 6, and 7 are modifications of the arrangement of Fig. 3. Figs. 8, 9, and 10 are diagrammatic illustrations of another form in which the initial movement of the rheostat-lever controls a loop-circuit containing a solenoid, which in turn controls one coil of a circuit-breaker employed with the rheostat. Figs. 11 and 12 are diagrammatic illustrations of an arrangement in which the auxiliary switch is electromechanically operated. Figs. 13 to 18 are diagrammatic views of modifications, and Figs. 19 and 20 are perspective views indicating the construction of certain parts.

Referring to Fig. 1, A is a suitable base provided with a series of contacts $a$, to which the sections of the resistance $a'$ (shown in dotted lines) are connected. This resistance, it will be understood, is arranged in any suitable manner beneath the base A or within a case of which A is the cover, and the sections of the resistance will be insulated from each other and in some instances provided with means for absorbing the heat energy developed therein. B is a switch in the form of a rheostat contact-lever pivoted on base A and whose short end is arranged to actuate the auxiliary switch. The auxiliary switch comprises two stationary contacts $c$ $c'$, a switch C, and an operating-hammer D, said switch and hammer being pivoted upon a stud $d$. Switch C is provided with a short arm having a pin $c^2$, which projects into a slot $d'$ in hammer D. The hammer is provided with a second slot $d^2$, through which projects a stationary pin $d^3$, secured to the base-plate. To the latter pin and pin $d^4$ at the lower end of the hammer is secured a coiled spring $d^5$, the function of which is to throw the hammer with a snap action to either side of a central position when moved by the arm $b$, and when thrown by the spring the hammer delivers a blow upon pin $c^2$, which results in the switch being rapidly moved in either direction. In the position shown the auxiliary switch is open and lever B is in the idle or open-circuit position. To start motor M, lever B is moved to the right, and in moving to the first or initial resistance-contact $a$ arm $b$, through its engagement with the left arm of hammer D, swings the hammer on its pivot. Pin $d^3$ being stationary, spring $d^5$ will be placed under increased tension during this movement, and as pin $d^4$ passes the center of equilibrium spring $d^5$ will throw the hammer to the dotted-line position, and in doing so a blow will be imparted to the switch, as above stated, and effect its closure. When the contact-lever B is returned to the starting position, its arm $b$ will engage the right arm of the hammer when the lever moves from the initial contact $a$ and throw the same in the opposite direction and effect the opening of the switch. Thus it will be seen that a slight angular movement of the lever B in either direction at the starting-point will close or open the circuit. In practice the auxiliary switch may be covered, so that the operator cannot operate the same without manipulating lever B. To prevent arcing at the blade and stationary contacts of the auxiliary switch, I provide spring-contacts and pins on which the arc is broken. These spring-contacts are preferably curved split springs of phosphor-bronze, one being secured edgewise to each contact $c$ and $c'$, and the pins are of copper and project from switch C. The springs are curved, so that they will be normally out of contact with the pins when the switch is closed. During the closing movement the pins engage the springs before the blade C enters contacts $c$ and $c'$, and in the opening movement the pins engage the spring just as the blade C is about to leave its contacts. I find that phosphor springs and copper pins or plates make good arc-breaking contacts, and by arranging these contacts so that they are in engagement only during the interval stated the movement of switch C is not materially retarded thereby.

The rheostat shown in Fig. 1 may be employed both as a starting or a regulating rheostat, and for that reason contact-lever B is not shown as provided with a retracting-spring, as usual. I prefer, however, to provide starting-rheostats with a retracting-spring, so that should the operator attempt to leave the contact-lever at the initial or starting position or at any intermediate position the spring will return it to the idle position, and in doing so the arm $b$ will operate the auxiliary switch.

In Fig. 2 the principle of Fig. 1 is applied to a starting-rheostat provided also with an underload or no-voltage release magnet and an overload-switch. In this figure parts similar to those of Fig. 1 are indicated by the same reference-letters. The underload-release magnet is of the usual construction and coöperates with an armature pivoted on lever B to hold the same in the final position. The overload-switch E is arranged as a knife-switch bridging two stationary contacts and is held in the closed position against spring tension by a latch which is arranged to be tripped by the movement of a core or plunger moving within a coil, as is now well understood. The overload-switch blade has an arm $e$, which projects into the path of movement of arm $b'$ on contact-lever B and is arranged so that switch E will be closed (if open) immediately after switch C is opened by the backward movement of lever B to the idle position. The switch E can therefore be closed only when the arm B is in a protective position. As shown, the controller is in the idle position, and the movement of lever B from the blind contact to the first rheostat-contact *a* will operate to close switch C by means of arm *b*, as explained in connection with Fig. 1, and the subsequent forward movement of lever B will cut out the first contact *a*, and the circuit through the resistance and to the motor or other translating device M will then be by way of wire 1 and lever B. If an overload occurs during the operation of lever B, switch E will open and lever B must be returned to the starting position to close it again by means of arm *b'*. If an overload occurs after lever B is in the final position, switch E will open and the underload-magnet will become deënergized and release lever B, which by means of its retracting-spring will be driven back to its idle position, and in doing so switch C will be opened and switch E will be closed. In returning lever B to the final position arm *b* will again close switch C. If an abnormal drop in voltage exists when lever B reaches the final position or occurs after it reaches that position, magnet F will not hold the lever against its spring, and hence that lever will return to its idle position and open switch C. From this description of Fig. 2 it will be seen that to maintain switch C closed under normal conditions lever B must be in its final position and held by magnet F; otherwise unless held against the tension of its spring by the operator the lever will return to its idle position and cause the opening of the circuit. It will also be seen that, like the arrangement in Fig. 1, lever B cannot be moved back and forth at the starting-point without opening or closing the circuit at the auxiliary switch C.

Figure 4:
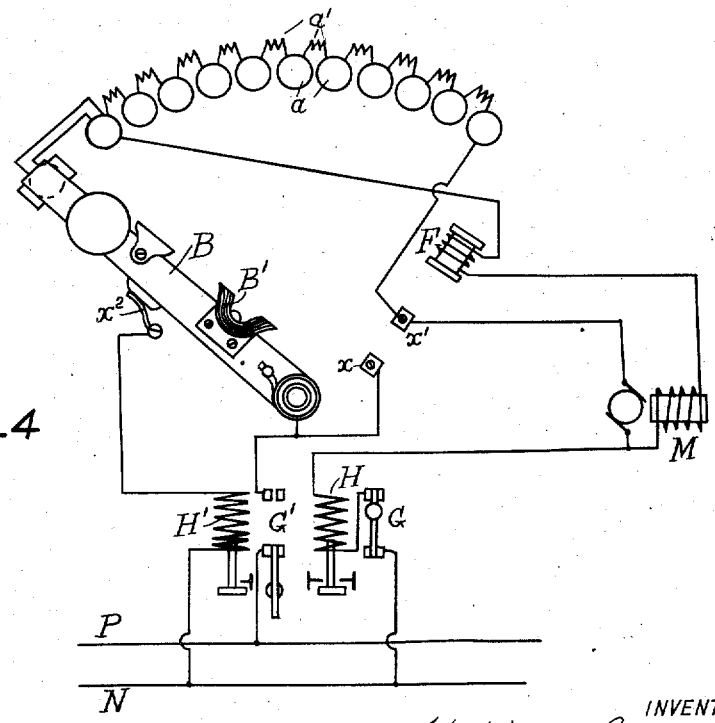

In Figs. 3 and 4 the movement of the rheostat-lever B controls a coil which actuates a plunger to trip a spring-actuated switch and which switch may be one element of a double-pole circuit-breaker. In these figures the parts corresponding to those already described in connection with Figs. 1 and 2 are indicated by the same reference-letters.

The auxiliary switch of Figs. 3 and 4 is an automatic circuit-breaker of the type shown in the patent to Leonard and Ball, No. 705,102, dated July 22, 1902. In Fig. 3, G and G' are independently-movable switches coöperating with stationary contacts between which is connected an overload-coil H, said switches and coil being connected in series between conductor P and the contact-lever B. The contact-lever carries a switch B' of the leaf-contact type, which bridges two stationary contacts *x* and *x'* when the lever is in the final position. Contact *x* is connected by a wire with the upper contact of switch G, and contact *x'* is connected by a wire with the final contact *a* of the resistance, so that while lever B is at the initial or any intermediate point the circuit to the armature of motor M from switch G will be through lever B and resistance *a'* to contact *x'*, the motor-armature being connected between the latter contact and conductor N. The field of M is connected in series with underload-magnet F between the initial contact *a* and conductor N, the field and armature windings being in shunt relation. It will be seen that when lever B is in the final position the armature-circuit of the motor will be through switch B', which makes very intimate contact at *x* and *x'*, the resistance being shunted out of the armature-circuit. With motor-starting rheostats it has been customary to provide spring contact-clips for the rheostat-lever at the final position, as shown in Fig. 2, to afford good contact and prevent heating, which would happen if a contact-button were employed for the final contact. With these spring-clip contacts, however, I have found it necessary to employ a hammer-blow device for the contact-lever to start the same when an automatic release is provided to control the circuit. With a leaf-contact switch, as shown in Figs. 3 and 4, a hammer-blow device is not necessary. The spring-brush affords good contact, and no undue heating occurs, and when the automatic release responds to abnormal conditions in the circuit the action of the leaf-contact assists the spring of the contact-lever to return it to the starting position. Switch G' in this form serves as the auxiliary switch, and its opening movement in response to the backward movement of the contact-lever at the initial position is controlled by fine-wire coil H', which is connected between conductor N and a stationary spring-contact $x^2$, which makes contact with lever B while in the initial position. The effect of this connection is to cause coil H' to become energized and actuate its core or plunger, which when raised trips the catch which holds switch G' closed and allows that switch to open, thus opening the circuit to the rheostat and motor. By reference to Fig. 3 it will be seen that so long as contact-lever B remains in the position shown or whenever the lever is returned to that position the high-resistance winding H' will be energized by the full electromotive force and switch G' will be opened. In operating the controller switch G is first closed and then G' is closed immediately after the initial movement of lever B, which breaks the connection at contact $x^2$, or switch G' is closed before lever B is moved and held until the latter is moved to the first resistance-contact *a* or switch G is first closed. Then lever B is moved to the first resistance-contact, breaking at $x^2$, and then switch G' is closed. If the operator returns lever B after the initial movement, the circuit will immediately be opened at switch G′ with a quick snap action, thus preventing the drawing of an arc. In Figs. 3 and 4 the first resistance-contact $a$ is connected by a wire with the initial contact, so that the circuit is never opened at the rheostat; but the resistance can never remain in circuit while the lever is in its initial position. In this form lever B is provided with the usual retracting-spring for returning it to the starting or initial position. It will be noticed that in Fig. 3 switches G and G′ are located in the same side of the circuit, while in Fig. 4 they are in opposite sides of the circuit, thus providing a double-pole switch. This is the only difference between Figs. 3 and 4. In each of these figures when the plunger of coil H is raised the latches holding switches G and G′ will both be tripped, as is customary in double-pole circuit breakers and as is the case in the Leonard and Ball patent above referred to.

The construction of a suitable automatic switch is indicated in Fig. 19. Here each switch G G′ is shown as carried by the pivoted part $g$ and each part having a handle for manual closing. Each part $g$ has a projection $g'$, adapted to be engaged by a latch $g^2$ for holding the switch in a closed position. The latches $g^2$ of both switches are controlled by the coil H and its core $h$. When the core is raised, due to the large current passing in coil H, both latches will be tripped by reason of the cross-piece $h^2$ engaging the extensions $g^3$ $g^3$, connected to the latches. The switches will then be opened, as by the force of springs $g^4$ and the rods $g^5$, since the latter are drawn outward by the tension of the springs, and which rods engage the surfaces $g^6$ on the switches. When the current in coil H′ causes its core $h'$ to be raised, its cross-piece $h^3$ will engage the extension $g^7$, which latter is connected to the latch $g^2$ of switch G′. The switch G′ will therefore be opened by the passing of current in coil H′.

Figure 13:
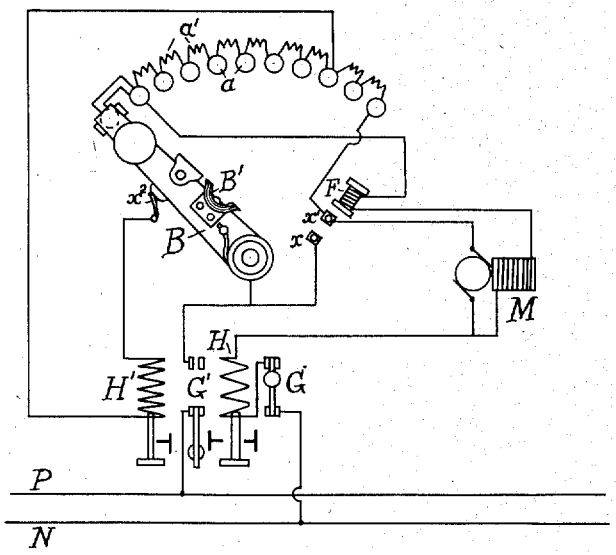

Instead of connecting coil H′ directly to conductor N it might in some cases be connected to an intermediate point in the circuit which would give sufficiently high voltage to operate the plunger of coil H′. Fig. 13 illustrates one such modification, being similar to Fig. 4, except that one end of coil H′ is connected to a point in the series of resistances. In this case the coil depends for its operation upon the drop in electromotive force on a portion of the resistance.

Figure 5:
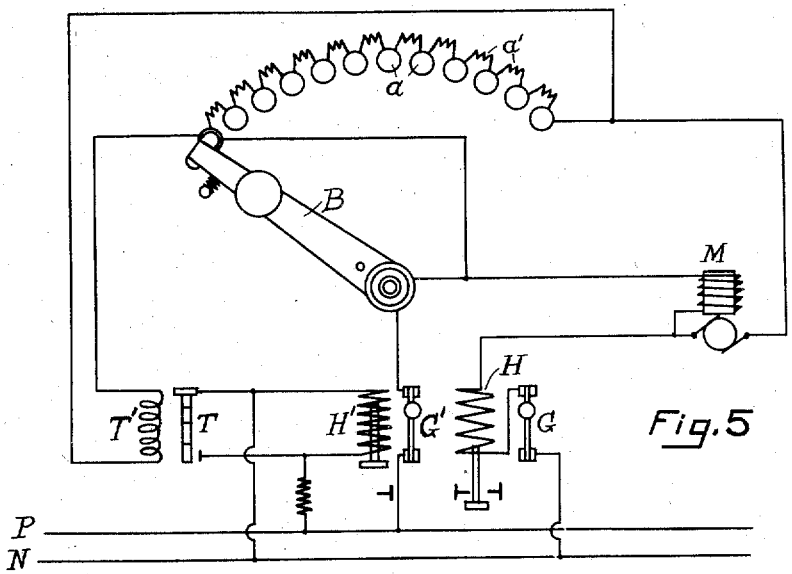

Referring now to Fig. 5, it will be seen that switches G G′ and coil H are connected in circuit in the same manner as in Fig. 4; but high-resistance coil H′ is connected across circuit P N in series with a high resistance. A thermostatic switch T is connected across the terminals of coil H′, so that when contact is made at the platinum points coil H′ will be short-circuited and its core or plunger will drop, tripping the latch which holds switch G′ and permitting its spring to throw it open. To actuate thermal strip T, I provide a small electric heater T′, which may be a pottery-tube having a resistance wound thereon, as shown in my patent No. 691,949, dated January 28, 1902. This heater is connected around all or part of the resistance of the rheostat, as shown, and it will be seen that since the heater when lever B remains on the initial rheostat-contact will be in the armature-circuit of the motor M across the line P N its temperature will rise rapidly, causing thermal switch T to short-circuit coil H′ and open the circuit between the rheostat-lever B and conductor P.

In operating the controller of Fig. 5 the operator first closes switches G and G′ and will see that the core or plunger of fine-wire coil H′ is raised into the coil. The closure of switches G and G′ gives a full field to motor M and closes the armature-circuit through the entire resistance of the rheostat. The drop on the resistance $a'$ causes heater T′ to heat up, and if lever B is allowed to remain in the initial position the heat of T′ will in a predeterminable time cause the thermostatic switch T to close the shunt around coil H′, thus demagnetizing that coil, whereupon its core drops and trips the latch which holds switch G′ closed. The movement of switch G′ through its actuating-spring opens the circuit to the motor and rheostat. An overload-current will cause coil H to raise its core and trip the latches holding both switches. If an abnormally low or no-voltage condition exists, coil H′ will be too weak to hold its core and switch G′ will be opened. An arrangement of the parts for such an operation of switches G G′ is indicated in Fig. 20, which is similar to Fig. 19, except that the parts are so arranged that the falling of core $h'$ causes the opening of switch G′ instead of the raising of core $h'$. The cross-piece $h^3$ of core $h'$ in falling will engage the extension $g^8$, connected to latch $g^2$, and cause the latch to be moved so that the switch G′ will be opened.

Figure 14:
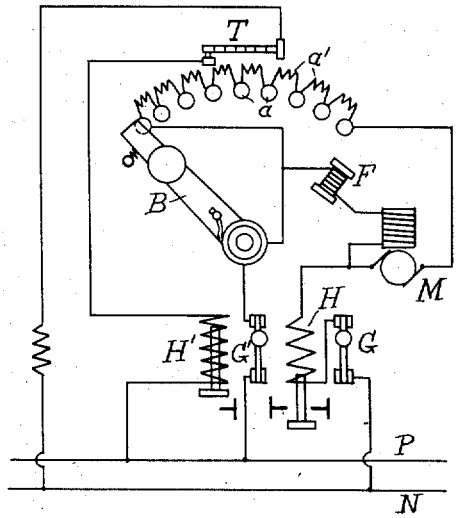
Figure 15:
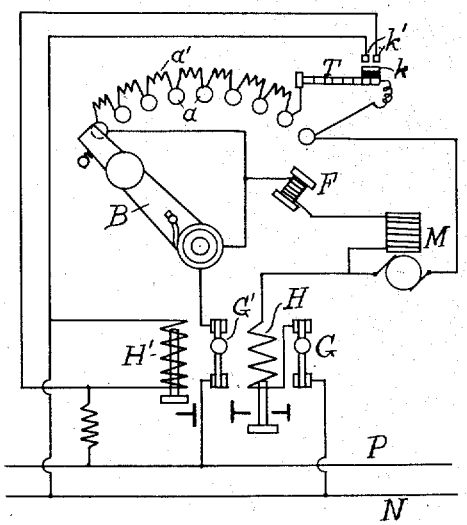

Various arrangements might be devised for heating the switch T when current flows through the resistance, and the switch T might cause the coil H′ to be deënergized in other ways. In Fig. 14 I have shown switch T in proximity to a part of the resistance $a'$, which resistance will serve to heat the switch if the arm B is held in position on the resistance-contacts an objectionable length of time. In this figure the switch T is shown in series with coil H′ and is adapted to open the circuit of this coil when heated instead of shunting the same, as in the case of Fig. 5. Another modification is shown in Fig. 15, in which the thermostatic controlling-switch T is connected in series with resistance $a'$ and heated by the current passing through $a'$, and if this resistance or any part thereof is kept in circuit an improper length of time it will cause the thermostatic switch T to be heated to such a degree that it will move and force the insulated conductor $k$ to engage the contacts $k'$ and short-circuit coil H′. The coil H′ is thus demagnetized, and the dropping of its core will cause the main circuit to be opened at switch G′. When the resistance-controlling arm is in final position, the thermostatic switch is cut out of circuit.

Figure 6:
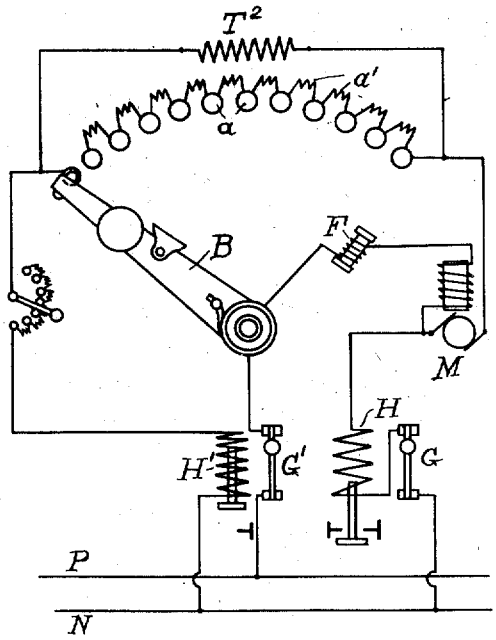

Instead of thermal strip T for controlling the action of coil H′ a resistance $T^2$, of iron, nickel, or other material having a high temperature coefficient might be connected in series with coil H′ across the line, as shown in Fig. 6. In the arrangement of this figure the circuit through coil H′ is closed by the closing of switch G′, and when the rheostat-lever B is moved to engage the initial resistance-contact the motor will start and begin to accelerate. After being held there a proper length of time the lever will be moved along, the starting resistance-contacts thereby disconnecting the initial resistance-contact from the first contact which originally actuated coil H′, and this coil is then placed in series with the resistance $T^2$. If the rheostat-arm B is left for an improper length of time on the starting resistance-contacts, the magnetism of coil H′, due to the gradual increase in resistance of $T^2$ on account of being heated by resistance $a'$ in close proximity to it, would gradually become less as the time interval increased and in a predeterminable time the core or plunger of that coil would drop and trip the catch which holds switch G′ closed, whereupon that switch would open. Another modification of this idea is shown in Fig. 7, in which a resistance T′, which may be mounted on a pottery tube, as in Fig. 5, is placed inside of a second pottery tube carrying a resistance $T^2$, of iron, nickel, or other material having a high-temperature coefficient. In this arrangement coil H′ and resistance $T^2$ are connected in series across the line, and heater T′ is connected in a shunt around the resistance $a'$ of the rheostat, as in Fig. 5 and for the same purpose. Instead of separating the resistances T′ and $T^2$ they might be arranged upon the same support and suitably insulated. To predetermine the time interval at which the condition of coils T′ and $T^2$ would cause the coil H to release its plunger, an adjustable resistance might be provided for heater T′, or when the windings of T′ and $T^2$ are on separate supports the distance between them or the relative positions of one within the other might be varied to vary the heating effect of T′ upon $T^2$. Various other ways of regulating the action of T′ and $T^2$ and H′ in the arrangement of Figs. 3, 4, and 7 might be devised without departing from the main feature of my invention.

Figure 16:
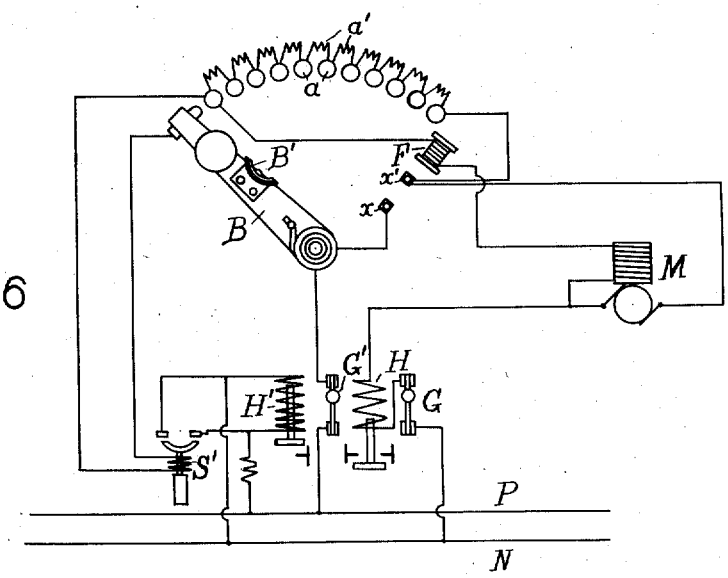

In Figs. 8 and 9 the coil H′ is controlled by an automatic switch. In Fig. 8 this coil is connected across the circuit in series with the automatic switch and a resistance, while in Fig. 9 the coil and automatic switch are connected in series with the rheostat. The automatic switch is preferably a double-arm switch S and $s$, pivoted on a common pivot and provided with a spring tending to throw them toward each other. Switch S makes contact with a spring-clip connected with coil H′ and which clip holds it in position while arm $s$ makes contact with a button connected to conductor N. This arm is held by a latch $s'$, which is tripped by the action of the core or plunger of coil S′. Arm $s$ is not provided with an operating-handle and is arranged to be moved onto its contact by arm S. The coil S′ for controlling this switch is connected across the first resistance-contact of the rheostat and a blind initial rheostat-contact. Although no means is indicated in Figs. 8 and 9 for holding the arm B in final position, it will be understood that when the arm is spring-actuated, as shown, some form of retaining means may be employed which is adapted to release the arm upon the occurrence of no voltage. It will be noted that the starter of Figs. 8 and 9 has no open-circuit point. To start the motor or other translating device, the operator first closes switch G, then switch-arms S and $s$ are closed, and then the operator holds down the plunger of coil S′ and closes switch G′. It will be seen that when this is done the circuit connections will be as indicated, that coil S′ is energized, and that if the operator permits lever B to remain on the initial or blind contact and lets go of the plunger of coil S′ that plunger will release switch-arm $s$ and open the circuit of coil H′, which in turn will drop its plunger and effect the opening of switch G′ and the circuit to the rheostat and translating device. If the operator moves lever B to its final position, as he should do, it will be seen that the circuit to coil S′ is opened the instant lever B leaves the initial contact and that switch-arm $s$ will remain locked until lever B is returned to its initial position, whereupon coil S′, becoming energized, will act as above stated. After lever B is moved from its initial position the rheostat and translating device will be protected against abnormal conditions in the circuit by switches G and G′. Instead of connecting the auxiliary switch of Figs. 8 and 9, as shown, it might be arranged to close a normally open shunt around coil H′. This is shown in Fig. 16. When current passes through the coil S′, its core is raised and the switch carried thereby closes the shunt around coil H′. Its core then drops and opens switch G′. The switch and coil might be arranged as a time switch by placing an iron or nickel resistance between the initial and first resistance-contacts of the rheostat, so that coil S′ will be connected as a shunt to an initial resistance step of variable resistance, which in this case would act automatically to increase its resistance due to its high-temperature coefficient and send an increasing current through coil S′. This is illustrated in Fig. 17, the resistance $T^2$ having a high-temperature coefficient. When predeterminable current passes through coil S′ and raises its core, the switch in the circuit of coil H′ is opened. Instead of such a resistance a time fuse might be employed, which when fused would cause the current to flow through S′. This modification is shown in Fig. 18, in which the time fuse is indicated at F′ between the first two contacts and is fused after carrying the starting-current a predetermined length of time. A still further modification is shown in Fig. 10, where coil S′ is connected as a shunt on the entire or part of rheostat resistance $a'$ in series with a carbon resistance $s^2$ or other material of negative temperature coefficient. In such an arrangement when the carbon becomes heated current will flow in the shunt and actuate coil S′ to release its switch and open or close a circuit, as above explained, to control coil H′, which may be connected in either of the ways suggested.

In Fig. 11 I have shown an electromechanically-operated auxiliary switch the action of which is governed by the movements of the rheostat-lever at its starting position. C is a pivoted knife switch-blade; $c$ $c'$, contact jaws, as in Figs. 1 and 2. D is the actuating-hammer, which in this instance is started by solenoids O and O′, whose cores are connected to the arms of the hammer, and $d^5$ is the spring for throwing the hammer after it passes the center of equilibrium, although in this arrangement the spring might be dispensed with, since the movement of the cores will be very rapid and move with increasing speed The circuit connections are from conductor P to switch C, to lever B, resistance $a'$ and motor M to conductor N, the field M being in a shunt from lever B around the resistance and motor armature. Coils O and O′ are connected in shunt relation between contacts $o$ and $o'$ and conductors P and N. Contacts $o$ and $o'$ are located adjacent to the first and second rheostat-contacts $a$, respectively, so that in the initial position lever B will bridge the first contact $a$ and contact $o'$, and in the second position contact $o$ and the second contact $a$ will be bridged. The effect of this is to connect either coil O′ or O in circuit, and, as shown, coil O is in circuit and its core is drawn down and hammer D is tilted to the right, closing switch C. If lever B is returned to its initial position, coil O will be cut out and coil O′ cut in, thus actuating the core of the latter to throw the hammer to the left and open switch C. When lever B is moved to its final position, both coils will be cut out of circuit and spring $d^5$ will hold switch C in position. A modification of this arrangement is shown in Fig. 12. Here only one coil $O^2$ is employed, and this coil is connected between conductor P and a contact $o^2$, with which the insulated short arm $b^2$ of lever B makes contact when in contact with any of the rheostat-contacts $a$ from the second to the final contacts, but not when in contact with the initial contact. Switch C (shown as a brush-switch) is provided with a rod Z, which breaks the arc on carbon contacts $z'$. This switch is mounted on a vertically-sliding rod $z^2$, provided at its upper end with a stirrup $z^3$, within which works a foot $o^3$, secured to the lower end of rod $o^4$, projecting from the core or plunger of coil $O^2$. The vertically-sliding rods $z^2$ and $o^4$ work in suitable guides, and the lower end of rod $z$ is rectangular and works in a correspondingly-shaped bearing to hold switch C in alinement with its stationary contacts. As shown in Fig. 12, the rheostat-lever B is in its second position and the circuit to coil $O^2$ is closed and its core is drawn up and switch C is closed. If now the operator returns lever B to the initial position, coil $O^2$ will become demagnetized and its plunger will drop, striking a blow to the stirrup, the force of which and the tension of the brush-switch will drive the switch downward and open the circuit to the rheostat and motor. When lever B is moved forward, closing the circuit again at contact $o^2$, the plunger of coil $O^2$ will rise and through the engagement of foot $o^3$ and stirrup $z^3$ switch C will be closed.

It will be noted that I have indicated a motor M in the drawings having a shunt field-winding and that the supply-circuit to both the armature and shunt-winding is opened by means of the automatic switch in the main circuit; also, that when the circuit is opened the armature and field are closed on themselves, giving a closed circuit for the field-discharge.

In various structures shown and described when the automatic switch is opened through the movement of the resistance-controlling element this element must be in such a position that substantially all of the resistance is in circuit. This insures the interrupting of a current which cannot exceed a certain amount, which amount is dependent upon said resistance. This definite relation between the position of the resistance-controlling element and the operation of the automatic switch thus insures a reduction in amount of sparking when the circuit is opened. In the form shown the resistance-controlling element when manually controlled is positively and directly moved by the operator both to insert and to cut out the armature resistance.

Where I have referred to "controlling means" in the claims it will be understood that this includes indirect as well as direct control.

It is evident that my invention may be embodied in various forms of construction and that I am not limited in the scope thereof except as indicated in the claims.

What I claim is—

1. The combination with a rehostat, of a separate switch, a device for causing a force to be suddenly applied at its full strength and thereby actuate said switch to either close or open the circuit, said switch and its operating device being capable of independent movement, and an arm on the rheostat contact-lever for operating said actuating device.

2. The combination of a rheostat, a separate switch, a device for causing a force to be suddenly applied at its full strength and thereby actuate said switch to either close or open the circuit, said switch and its operating device being capable of independent movement, and an arm on the rheostat contact-lever arranged to engage said device at a predetermined point in the forward or backward movement of the lever.

3. The combination with a rheostat and its contact-lever, of a switch for controlling the circuit to said rheostat, means for controlling said switch comprising a hammer-blow device, and means on said contact-lever for controlling the movement of said hammer-blow device.

4. The combination with a rheostat and its contact-lever, of a switch for controlling the circuit to said rheostat comprising stationary contacts and a pivoted switch-blade, an actuating device for said switch-blade comprising a pivoted hammer and a spring for moving the same, said hammer having a movement independent of the switch-blade, and means whereby the movement of said actuating device is controlled by the rheostat-lever.

5. The combination with a rheostat and its contact-lever, of a switch for controlling the circuit to said rheostat comprising stationary contacts and a pivoted switch-blade, an actuating device for said switch-blade comprising a pivoted hammer and a spring for moving the same, said hammer having a movement independent of the switch-blade, and means on said contact-lever for engaging said hammer to start it in movement at a predetermined position of the contact-lever.

6. The combination with a rheostat and its contact-lever, of a switch for controlling the circuit to said rheostat comprising stationary contacts, a pivoted switch-blade, auxiliary spring-metal contacts on each of the said stationary contacts and pins on said switch-blade for making contact with said spring, an actuating device for said switch-blade comprising a pivoted hammer and a spring for moving said hammer and having a movement independent of the switch-blade, and means whereby the movement of said actuating device is controlled by the rheostat-lever.

7. The combination with a rheostat, of a switch, a spring-actuated hammer for operating same, and means engaged by the rheostat-lever at the starting position to start said hammer and effect the closing or opening of the switch as said lever is moved forward or backward.

8. The combination with a rheostat, of a switch, an actuating device therefor, means whereby said switch is closed or opened by the forward or backward movement of the rheostat-lever at the starting position, and an automatic switch responsive to abnormal conditions in the circuit, arranged to be moved in one direction by said lever.

9. The combination with a rheostat, of a switch, an actuating device therefor, means whereby said switch is closed or opened by the forward or backward movement of the rheostat-lever at the starting position, and an automatic switch responsive to abnormal conditions in the circuit, said two switches being arranged for successive operation by said lever to close the circuit.

10. The combination with a rheostat and its contact-lever, of a separate switch, a device for actuating said switch to either close or open the circuit, said switch and its operating device being capable of independent movement, an arm on the rheostat contact-lever for operating said actuating device, and an electroresponsive device responding to abnormal conditions in the circuit to open the rheostat-circuit.

11. The combination with a rheostat and its contact-lever, of a separate switch, a device for actuating said switch to either close or open the circuit, said switch and its operating device being capable of independent movement, an arm on the rheostat contact-lever for operating said actuating device, an automatic switch controlled by an electroresponsive device responding to abnormal conditions in the circuit, and means whereby said automatic switch is closed by the movement of the rheostat-lever toward the starting position.

12. The combination with a rheostat and a spring-actuated contact-lever therefor, of an independent switch, means whereby said switch is closed and opened respectively through the forward and backward movement of the contact-lever, an electromagnet for holding said contact-lever in its final position, an automatic switch, an electroresponsive device controlling the opening movement of said second switch, and means whereby said second switch is closed by the backward movement of the contact-lever.

13. The combination with a rheostat and a spring-actuated contact-lever therefor, of a separate switch, an actuating device for said switch capable of movement independent thereof, means whereby said actuating device is operated to close or open said switch respectively by the forward or backward movement of the contact-lever, and an electroresponsive device for automatically releasing the contact-lever and permitting its return to the starting position under abnormal conditions in the circuit.

14. The combination of a hand-operated electric switch, a switch in series therewith, and mechanical means caused to act by the movement of said hand-operated switch for suddenly applying a force at its full strength and thereby cause the movement of said second switch.

15. The combination with a rheostat having a contact-lever for controlling the resistance, of a switch in series therewith, means for automatically moving said switch to the closed position, means operated by the movement of the contact-lever for controlling the closing movement of said switch, an electroresponsive device responding to overload, a second switch whose opening movement is controlled by said device, and means for closing said second switch through the movement of the rheostat contact-lever.

16. The combination with a rheostat and its contact-lever, of a switch for controlling the circuit to said rheostat, means for controlling said switch comprising a hammer-blow device, and means whereby the movement of said device is controlled mechanically by said rheostat-lever.

17. The combination of a resistance having a movable element adapted to control said resistance, a switch for controlling the circuit to said resistance, means for controlling said switch having a movement independent of the switch, and means controlled by said movable element for causing the movement of said first-named means to thereby cause a force to be suddenly made effective at its full strength to move said switch.

18. The combination with a rheostat having a movable element for controlling the resistance, of a switch in series therewith, and means controlled by the movement of said movable element for causing a force to be suddenly made effective at its full strength for controlling the closing and opening movement of said switch.

19. The combination with a rheostat having a movable element for controlling the resistance, of an automatic switch in series therewith, means operated by the movement of said element for controlling the automatic closing and automatic opening of said switch, and an electroresponsive device responding to overload to protect the circuit under all operating conditions.

20. The combination with a supply-circuit, of a resistance having a movable element for varying said resistance, a switch in series therewith, means for controlling the opening of said switch, said means being controlled by said movable element, and means for controlling the opening of said circuit upon the occurrence of overload, said overload means comprising an additional electromagnetic switch.

21. The combination with a supply-circuit, of a resistance having a movable element for varying said resistance, a switch in series therewith, means for controlling the closing and opening of said switch, said means being controlled by said movable element whereby said switch is closed when said element is moved in a direction to reduce said resistance and opened when moved in a direction to increase said resistance, and means responding to overload and no voltage for controlling the opening of said circuit, said overload means being effective independently of the position of said element.

22. The combination with a supply-circuit, of a resistance having a movable element for varying said resistance, a switch in series therewith, means for controlling the opening of said switch, said means being controlled by said movable element, a second series switch, and means for controlling the opening of said second switch upon the occurrence of overload.

23. The combination with a supply-circuit, of a resistance having a movable element for varying said resistance, a switch in series therewith, means for controlling the opening of said switch, said means being controlled by said movable element, a second series switch, means for closing said second switch by the movement of said movable element, and means for opening said second switch upon the occurrence of abnormal conditions in the circuit.

24. The combination with a supply-circuit, of a resistance having a movable element for varying said resistance, a switch in series therewith, means for controlling the opening of said switch, said means being controlled by said movable element, a second series switch, means for controlling the closing of said second switch by the movement of said movable element, means for controlling the opening of said second switch upon the occurrence of overload, and means for controlling the opening of said circuit upon the occurrence of no voltage.

25. The combination of a resistance having a movable element adapted to vary said resistance, a switch for controlling the circuit to said resistance, means for controlling the automatic closing and opening of said switch, said means comprising a movable part controlled by said movable element and having a movement independent of the movement of said switch, and means for controlling the opening of said circuit upon the occurrence of overload.

26. The combination of a resistance having a movable element adapted to vary said resistance, a switch for controlling the circuit to said resistance, means for controlling the opening of said switch, said means comprising a movable part controlled by said movable element at the initial position of said element and having a movement independent of said switch, and means for controlling the opening of said circuit upon the occurrence of no voltage.

27. The combination of a resistance having a movable element adapted to vary said resistance, a switch for controlling the circuit to said resistance, means for controlling the opening of said switch, said means comprising a movable part controlled by said movable element at the initial position of said element and having a movement independent of the movement of said switch, and means responsive to overload and to no voltage for controlling the opening of said circuit.

28. The combination of a resistance having a movable element adapted to vary said resistance, a switch for controlling the circuit to said resistance, means for controlling the opening of said switch, said means comprising a movable part controlled by said movable element and having a movement independent of said switch, a second switch, means for controlling the closing of said second switch by the movement of said movable element, and means for controlling the opening of said second switch upon the occurrence of abnormal conditions in the circuit.

29. The combination of a supply-circuit, a resistance having a movable element adapted to vary said resistance, a switch for controlling the circuit to said resistance, means for controlling the opening of said switch, said means comprising a movable part controlled by said movable element and having a movement independent of the movement of said switch, a second switch, means for controlling the closing of said second switch by the movement of said movable element, means for controlling the opening of said second switch upon the occurrence of overload, and means for controlling the opening of said circuit upon the occurrence of no voltage.

30. The combination with a supply-circuit, of a resistance, means for varying said resistance, a switch in series with said resistance, means for controlling the opening of said switch, said latter means being controlled by said resistance-varying means so that said switch interrupts the current through said resistance-varying means when the amount of said resistance in circuit is a maximum, and an electroresponsive means for controlling the opening of said circuit upon the occurrence of overload.

31. The combination of a rheostat having a movable element, for controlling the resistance, an automatic switch in series with said resistance, means for controlling the automatic opening of said switch when the resistance-controlling element is in a certain position so as to interrupt the current in said element when substantially all of said resistance is in circuit, and an electroresponsive device which effects the opening of the circuit upon the occurrence of predetermined overload-current.

32. The combination of a rheostat having a movable element by the movement of which the resistance in circuit can be varied from a certain minimum to a certain maximum, a circuit-opening automatic switch in series with said resistance, means for controlling the automatic opening of said switch when the movable element is moved to a certain position and to cause said switch to interrupt the current through said element when substantially all of said resistance is in circuit, and means responsive to a predeterminable maximum energy in the circuit for effecting the opening of the circuit.

33. The combination of a resistance, an element for controlling said resistance but which cannot open the circuit in which said resistance is connected, a circuit-opening switch in series with said resistance, means for controlling the automatic opening of said switch when the said controlling element is in position to insert substantially all of said resistance, and means for protecting the circuit upon the occurrence of no voltage and upon the occurrence of overload-current.

34. The combination of a motor having a shunt field-winding, an automatic switch for controlling the current to both the armature and field-winding of said armature, a resistance in the armature-circuit of said motor, a hand-operated device for controlling the amount of said resistance in the armature-circuit, means for controlling the automatic opening of said automatic switch so as to open the circuit when the said device is in a certain position so as to interrupt the current through said device when substantially all of said resistance is in circuit, and means for protecting the armature-circuit upon the occurrence of no-voltage and overload conditions.

35. The combination of a supply-circuit, a resistance having a movable element for varying said resistance, a switch in series therewith, means for controlling the closing and opening of said switch, said means being controlled by said element to insure the closing of said switch when said element is moved in a direction to reduce said resistance and to insure the opening of said switch when said element is moved in a direction to increase said resistance so that the current through said movable element is interrupted by said switch, and means for controlling the opening of said circuit upon the occurrence of overload.

36. The combination of a motor-rheostat having a movable element for controlling the resistance, an electromagnetic overload-circuit breaker in series with said rheostat, the said circuit-breaker and movable element being mounted independently, means for normally restraining said movable element and for releasing the same upon the occurrence of an abnormal condition, and means functionally relating the said circuit-breaker and movable element whereby the circuit-breaker is closed only when there is protective amount of resistance in circuit.

37. The combination of a motor-controlling resistance, a movable element for varying the amount of said resistance in circuit, an automatic switch in series therewith, said switch and movable element being functionally related, and a second automatic switch in series therewith for automatically protecting the circuit upon the occurrence of abnormal conditions.

38. The combination of a motor-controlling resistance, a movable element for varying the amount of said resistance in circuit, an automatic switch in series therewith, said switch and said movable element being functionally related for opening and closing said switch so that the said switch will establish and interrupt the current through said movable element when substantially all of said resistance is in circuit, means for protecting the circuit upon the occurrence of no voltage and means for protecting the circuit upon the occurrence of overload.

39. The combination with a motor-rheostat having a movable element for controlling the resistance, two automatic switches in series with each other and with said rheostat, and means for controlling the closing movement of at least one of said switches whereby the movable element must be in a protective position when said automatic switch or switches are closed.

40. The combination of a resistance, a contact device for varying said resistance, an auxiliary quick-acting switch in series therewith for opening the circuit functionally related to said contact device, a magnetic circuit-breaker for opening the circuit upon the occurrence of an abnormal condition of the circuit comprising an additional electromagnetic switch in series with said resistance, and means whereby the closing of the circuit-breaker when the resistance is in a non-protective condition is avoided.

41. The combination with a supply-circuit, of a resistance, means for varying said resistance, a switch in series with said resistance, means for controlling the opening of said switch, said latter means being controlled by said resistance-varying means, and means for controlling the opening of said circuit upon the occurrence of overload, said overload means comprising an additional electromagnetic switch.

42. The combination with a supply-circuit, of a resistance, means for varying said resistance, a switch in series with said resistance, means for controlling the opening of said switch, said latter means being controlled by said resistance-varying means so that said switch will interrupt the current through said resistance-varying means when said resistance in circuit is a maximum, and means for controlling the opening of said circuit upon occurrence of overload, said overload means comprising an additional electromagnetic switch.

43. The combination with a motor-controlling rheostat having a movable element for controlling the resistance, two automatic switches in series therewith, the said switches being independently closable, and means for controlling the closing movement of at least one of said switches whereby the movable element must be in a proper position when said automatic switch or switches are closed.

44. The combination with a motor-rheostat having a movable element for controlling the resistance, two automatic switches in series therewith, the said switches being independently closable, and means for controlling the closing movement of at least one of said switches whereby the movable element must be in a protective position when said automatic switch or switches are closed.

45. The combination with a motor-rheostat having a movable element for controlling the resistance, two automatic switches in series with each other and with said rheostat, the said switches being closable in succession, and means for controlling the closing movement of at least one of said switches whereby the movable element must be in a protective position when said automatic switch or switches are closed.

46. The combination of a resistance-controlling arm, a switch moved thereby to a certain position, means for restraining the switch in said position, a second switch, and means controlled by said arm for moving said second switch to its closed position when the said resistance-controlling arm is moved away from its initial position.

47. The combination of a rheostat, two switches in series with each other closable successively, means for automatically opening the switch first closed if an excessive current flows in the circuit when the second switch is closed, and means for insuring the closure of said two switches only when the rheostat is in a desired starting condition.

48. The combination of a resistance having a movable contact device, two switches in series with each other closable successively, means for automatically opening one of said switches upon the occurrence of predetermined overload-current, means for retaining said contact device normally in a certain position and for releasing said device upon the occurrence of an abnormal condition in the circuit, means for moving said device to a protective position when released, and means for insuring the closing of said overload-switch only when said contact device is in a protective position.

49. The combination of a motor, a rheostat for said motor having a movable resistance-varying element, a switch, means for causing the movement of said element to control the movement of said switch in two directions at the starting position, an electroresponsive winding the current in which is controlled by said switch when moved in each of said two directions, and a switch in series with the motor-armature controlled by said electroresponsive winding.

50. The combination of a motor, a rheostat for said motor having a movable resistance-varying element, means for causing an auxiliary electrical contact to be made by the movement of said element to a certain position and to be broken by its movement in a direction to insert resistance, an electroresponsive winding the current in which is affected by the making and breaking of said contact, and a switch in series with the motor-armature controlled by said electroresponsive winding.

51. The combination of a circuit-controlling rheostat having a movable resistance-varying element, means for controlling the making of an auxiliary electrical contact by the movement of said element in a direction to reduce said resistance and for controlling the breaking of said contact by its movement in the opposite direction, an electroresponsive winding the current in which is affected by the making and breaking of said contact, and an automatic switch controlled by said winding.

52. The combination of a circuit-controlling rheostat having a movable resistance-varying element, means for causing an auxiliary electrical contact to be made by the movement of said element to a certain position and to be broken by its movement in a direction to insert resistance, an electroresponsive winding the current in which is affected by the making and breaking of said contact, an automatic switch controlled by said winding, and means for protecting the circuit upon the occurrence of no voltage.

53. The combination of a motor, a rheostat in circuit with the armature thereof, a switch in series with the armature, electroresponsive means which respond to effect the movement of said switch to a protective position under abnormal conditions, a second switch which controls the current to said electroresponsive means, said second switch being in series with said first-named switch and armature, and means for causing the control of said latter switch only when said rheostat is in a proper condition.

54. The combination of a resistance, a movable element for varying the resistance, two switches in series with each other and with said resistance, one of said switches being so functionally related to said movable element that the circuit through said two switches can be closed only when said movable element is in a proper starting position, and automatic means for controlling the other of said switches upon the occurrence of an abnormal circuit condition.

55. The combination of two independently-movable switches and a rheostat all in series with each other, a motor to which said switches and rheostat are functionally related, means for functionally relating at least two of said devices so that they cannot both be closed except when the third device is in a proper starting position, and means for causing at least two of said devices to be moved automatically in response to abnormal circuit conditions.

56. The combination of an electric motor, a controlling-rheostat having a manually-controlled element, a switch in series with said rheostat, and means controlled by said element when moved in a direction to insert and in a direction to cut out resistance for causing a force to be suddenly made effective at its full strength for respectively quickly opening and quickly closing said switch independently of the rate of movement of said element.

57. The combination with a rheostat and a movable element for varying the resistance, of a switch for controlling the circuit to said rheostat, a device for controlling the closing and opening of said switch by causing a force to be suddenly made effective at its full strength and thereby actuate said switch, and means operated by said element when moved in a forward and backward direction for respectively controlling the closing and opening movement of said switch.

58. The combination of a resistance-controlling electric switch adapted to be moved positively by the operator to both cut out and insert resistance, a switch in series therewith, means for moving said second switch to the closed position comprising means controlled by the movement of said resistance-controlling switch for causing a force to be suddenly applied at its full strength and thereby control the closing movement of said second switch.

59. The combination of a resistance-controlling electric switch, a switch in series therewith, and means operated by the movement of said resistance-controlling switch for causing a force to be suddenly made effective at its full strength and thereby control both the closing and opening movement of said second switch.

60. The combination of a rheostat having a movable element for varying the resistance, said element being adapted to be moved positively in both directions by the operator to insert and cut out resistance, a switch in series therewith, and means operated by said element at its initial position for causing a force to be suddenly made effective at its full strength and thereby control the opening movement of said switch.

61. The combination of a rheostat having a movable element for varying the resistance, a switch for controlling the circuit to said rheostat, means operated by said element at its initial position for controlling the opening movement of said switch, and an electroresponsive winding responding to overload to effect the opening of the circuit.

62. The combination of a rheostat having a movable element and handle adapted to be positively moved by the operator to reduce the resistance, of a switch in series therewith, means for effecting the opening and closing of said switch, said means comprising a device operated by the movement of said movable element when said element is moved in opposite directions to effectively control the closing and opening of said switch, and an electroresponsive winding responding to overload to effect the opening of the circuit independently of the position of said movable element.

63. The combination of a rheostat having a movable element for varying the resistance, a switch for controlling the circuit to said rheostat, means operated by said element for controlling the opening movement of said switch when said element is in position to insert substantially all of said resistance, and an electroresponsive winding responding to overload to effect the opening of the circuit.

64. The combination of a rheostat having a movable element for varying the resistance, a switch for controlling the circuit to said rheostat, means operated by said element for controlling both the closing and opening movement of said switch when said element is in position to insert substantially all of said resistance, and an electroresponsive winding responding to overload to effect the opening of the circuit.

65. The combination of a rheostat having a movable element for varying the resistance and adapted to be moved by the operator in both directions, a switch in series therewith, means operated by said element for controlling the quick-opening movement of said switch when said element is in position to insert substantially all of said resistance and independently of the rate of movement of said element, an electroresponsive winding responding to overload to effect the opening of the circuit, and an electromagnetic protective device responding to no voltage.

66. The combination of a rheostat having a movable element for varying the resistance and adapted to be moved by the operator in both directions, a switch in series therewith, means operated by said element for controlling the quick-closing and quick-opening movement of said switch when said element is in position to insert substantially all of said resistance and independently of the rate of movement of said element, and an electromagnetic protective device responding to no voltage.

67. The combination of a device which produces an electromotive force by magnetic induction, an automatic switch whose automatic movement is dependent upon a current other than the current passing through said device, a second automatic switch whose automatic movement is dependent upon the current through said device, said switches being protectively related but independently mounted and being in series with each other and with said device.

68. The combination of a device which produces an electromotive force by magnetic induction, an automatic switch whose automatic movement is dependent upon a current other than the current passing through said device, a second automatic switch whose automatic movement is dependent upon the current through said device, said two switches and said device being in series in the same circuit, and an auxiliary contact device for at least one of said switches for quickly opening the circuit independently of the rate of movement of said switch.

69. The combination of an electromotive-force-producing device, an automatic switch whose automatic movement is dependent upon a current other than the current passing through said device, a second automatic switch whose automatic movement is dependent upon the current through said device, said two switches and said device being in series in the same circuit, and an auxiliary contact device for at least one of said switches for quickly closing the circuit independently of the rate of movement of said switch.

70. The combination of an electromotive-force-producing device, an automatic switch whose automatic movement is dependent upon a current other than the current passing through said device, a second automatic switch whose automatic movement is dependent upon the current through said device, and an auxiliary contact device for quickly opening and quickly closing the circuit caused to act by the movement of at least one of said switches and independently of the rate of movement of said switch.

71. The combination of an electric motor, an armature-resistance-controlling switch, a second switch in series therewith, two electroresponsive devices for protecting the motor-armature under abnormal conditions, one of said electroresponsive devices being in series with the motor-armature and the other being not in series therewith, means whereby said resistance-controlling switch must be moved to a certain position before said second switch can be closed, and an auxiliary contact device for quickly opening the circuit operated by the movement of one of said switches but independently of the rate of movement of said switch.

72. The combination of an electric motor, a switch in series with the armature thereof, a resistance-controlling switch in series therewith and whose movement effects the closing of said first-named switch, auxiliary contact means for quickly opening the circuit controlled by but independent of the rate of movement of one of said switches, and two independent electromagnetic windings which act automatically and independently to protect the circuit upon the occurrence of two different abnormal conditions respectively, one of said windings being not in series with the armature.

73. The combination of an electric motor, a switch in series with the armature thereof, a resistance-controlling switch in series therewith whose movement is protectively related to control the closing of said first switch, auxiliary contact means for quickly closing the circuit operated by the movement of one of said switches but independent of the rate of movement of said switch, and two independent electromagnetic windings which act automatically and independently to protect the circuit upon the occurrence of two abnormal conditions respectively, one of said windings being not in series with the armature.

74. The combination of an electric motor, a hand-operated motor-armature-controlling switch, a second switch whose closure is effected by the movement of said hand-operated switch, means for causing the quick closing and quick opening of the circuit independently of the rate of movement of said hand-operated switch, and independent electroresponsive means which act independently to protect the armature-circuit upon the occurrence of excessive current or upon the occurrence of failure of the supply electromotive force respectively, one of said electroresponsive means being not in series with the armature.

In testimony whereof I affix my signature in the presence of two witnesses.

H. WARD LEONARD.

Witnesses:
JAMES COOK,
B. J. REDMOND.